United States Patent
Campbell et al.

(10) Patent No.: US 10,528,657 B2
(45) Date of Patent: Jan. 7, 2020

(54) SPREADSHEET COLLABORATION IN A MULTI-DEVICE ENVIRONMENT

(71) Applicant: Microsoft Technology Licensing, LLC, Redmond, WA (US)

(72) Inventors: John Campbell, Renton, WA (US); Carlos Augusto Otero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/173,453

(22) Filed: Oct. 29, 2018

(65) Prior Publication Data

US 2019/0065457 A1 Feb. 28, 2019

Related U.S. Application Data

(63) Continuation of application No. 15/438,504, filed on Feb. 21, 2017, now Pat. No. 10,120,854, which is a continuation of application No. 13/918,912, filed on Jun. 15, 2013, now Pat. No. 9,588,954.

(51) Int. Cl.
| | |
|---|---|
| *G06F 17/24* | (2006.01) |
| *G06F 3/0484* | (2013.01) |
| *H04L 29/06* | (2006.01) |
| *G06Q 10/10* | (2012.01) |
| *G06F 9/451* | (2018.01) |

(52) U.S. Cl.
CPC .......... *G06F 17/246* (2013.01); *G06F 3/0484* (2013.01); *G06Q 10/101* (2013.01); *H04L 65/403* (2013.01); *H04L 65/4038* (2013.01); *H04L 65/602* (2013.01); *H04L 65/80* (2013.01); *G06F 9/452* (2018.02)

(58) Field of Classification Search
CPC ............................ G06Q 10/101; G06F 17/246
See application file for complete search history.

(56) References Cited

U.S. PATENT DOCUMENTS

| | | | | |
|---|---|---|---|---|
| 7,363,589 | B1 * | 4/2008 | Maeng | G06Q 10/10 715/719 |
| 8,510,266 | B1 * | 8/2013 | Ho | G06F 17/246 707/609 |
| 2011/0252339 | A1 * | 10/2011 | Lemonik | G06F 17/2288 715/753 |
| 2012/0284646 | A1 * | 11/2012 | Sitrick | G06Q 10/10 715/753 |

(Continued)

*Primary Examiner* — Asher D Kells

(57) ABSTRACT

Application/document collaboration in a multi-device environment is provided. An application and associated document or other content, for example, a spreadsheet application and associated spreadsheet documents and content may be displayed on one or more endpoint display devices. A presenter may control the application/document from another device, for example, a smartphone, tablet-style computer, laptop computer, desktop computer, and the like. User interactions on the presenter control device may be reflected on the display device, including, document navigation, document editing, document entry, and the like. Document content may be previewed on the control device before it is sent to the display device. Document metadata and/or presenter notes/comments, etc., may be displayed only on the control device, but not on the display device, as desired by the presenter/user.

20 Claims, 10 Drawing Sheets

(56) References Cited

U.S. PATENT DOCUMENTS

| | | | | |
|---|---|---|---|---|
| 2013/0080785 A1* | 3/2013 | Ruhlen | ............... | H04L 67/16 |
| | | | | 713/176 |
| 2014/0218289 A1* | 8/2014 | Dai | ............... | H04M 1/72533 |
| | | | | 345/157 |
| 2016/0055140 A1* | 2/2016 | McKenzie | ............ | G06F 17/246 |
| | | | | 715/212 |
| 2018/0074779 A1* | 3/2018 | Marquardt | ............ | G06F 3/1454 |

* cited by examiner

SPREADSHEET COLLABORATION IN A MULTI-DEVICE ENVIRONMENT

CROSS-REFERENCE TO RELATED APPLICATIONS

This application is a continuation of U.S. patent application Ser. No. 15/438,504 (now U.S. Pat. No. 10,120,854), filed on Feb. 21, 2017, which application is a continuation of U.S. patent application Ser. No. 13/918,912 (now U.S. Pat. No. 9,588,954), filed on Jun. 15, 2013, entitled "APPLICATION/DOCUMENT COLLABORATION IN A MULTI-DEVICE ENVIRONMENT," the disclosures of which are hereby incorporated herein by reference in their entirety.

BACKGROUND

With the advent of modern wired/wireless computing systems, the desire/need to engage in collaborative meeting sessions has greatly intensified. In addition, owing to great developments in computing devices/systems of a variety of shapes/sizes and functionalities, users are no longer satisfied with using whiteboards, blackboards, projection screens, and the like for conducting meetings or work sessions.

Conducting a collaborative session using a spreadsheet application and associated document is often problematic owing to the complexity of spreadsheet functionality. For example, a typical spreadsheet application user utilizes the functionality of the application for creating content, modifying content (e.g. filtering, sorting, calculating, summarizing, charting, tabling, and the like), presenting the content, sharing the content, and the like. When a user is presenting spreadsheet application functionality and associated content in a collaborative work session, the user may wish to present spreadsheet application content to other users without showing the other users the underlying calculations, metadata, presenter notes, and the like, but instead, the presenting user may desire to fully control the content that is displayed to other users in the collaborative work session from the presenting user's device. Unfortunately, because current spreadsheet application functionalities do not allow for this type of collaborative exchange between devices, use of spreadsheet applications and associated documents or other content in a collaborative work session may be inefficient, cumbersome, or unsatisfying. A way of communicating changes to a spreadsheet between multiple devices running a full or partial spreadsheet application and giving one of the devices control over committing the changes to the spreadsheet would be an improvement providing a technical advantage over the current state of the art because it would give multiple users the ability to collaborative create and edit a spreadsheet application while retaining the integrity of the spreadsheet document.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing application/document collaboration in a multi-device environment. According to embodiments, application functionality and associated documents or other content may be enabled in a multi-device environment. An application and associated document or other content, for example, a spreadsheet application and associated spreadsheet documents and content may be displayed on one or more endpoint display devices. A presenter may control the application/document from another device, for example, a smartphone, tablet-style computer, laptop computer, desktop computer, and the like. User interactions on the presenter control device may be reflected on the display device, including, document navigation, document editing, document entry, and the like.

Document content may be previewed on the control device before it is sent to the display device. Document metadata and/or presenter notes/comments, etc., may be displayed only on the control device, but not on the display device, as desired by the presenter/user. That is, the presenting user may interact with the software application and/or content on his/her presenter control device, including modifying the data, reviewing document metadata, presenter notes, and the like without publishing such information to the endpoint display device for review by other users. Alternatively, as desired, the presenting user may send desired content from the control device to the display device.

According to embodiments, the control device may operate as a full application/device editor, and the endpoint device may be readily switched such that another device, including small-form user devices of other users may become the endpoint display device for the collaborative session. That is, in a collaborative work session, any computing device may be designated as the presenter control device or as the endpoint display device, as desired by participants in the collaborative work session.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
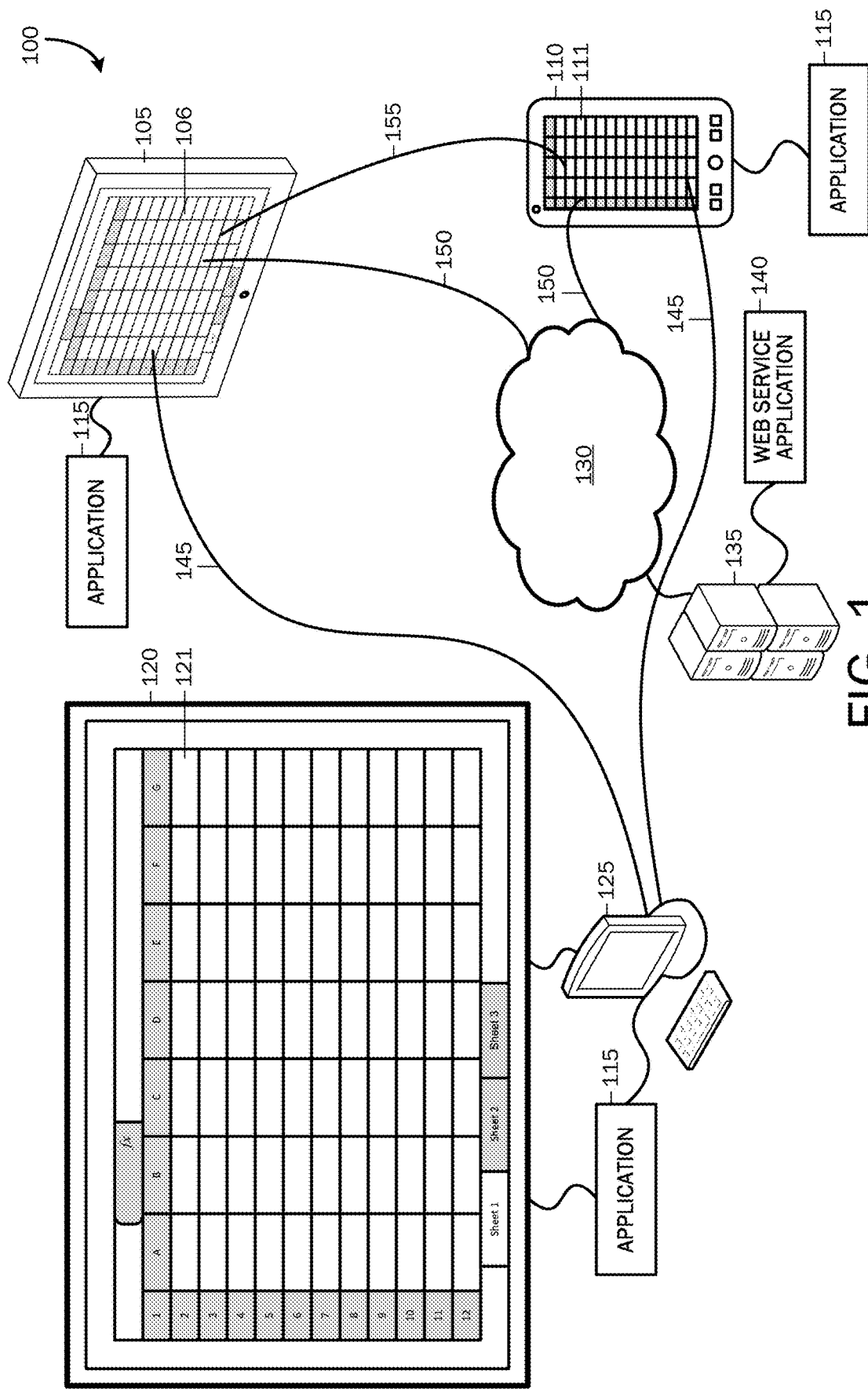
FIG. 1 illustrates a system architecture in which embodiments of the present invention may be practiced.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described may be modified by substituting, reordering, or adding stages to the disclosed methods. Accordingly, the following detailed description does not limit the invention but, instead, the proper scope of the invention is defined by the appended claims.

As briefly described above, embodiments of the present invention are directed to application/document collaboration in a multi-device environment. In a multi-device environment, an application and associated document, for example, a spreadsheet application and associated spreadsheet documents and other content, may be controlled by a control device, for example, a smartphone, tablet-style computer, laptop computer, desktop computer, and the like, and application documents and/or other content may be presented to one or more endpoint display devices in a collaborative working session. Each endpoint display device likewise may take the form of any suitable computing device, as described above for the control device. According to embodiments, computing devices operating in the collaborative work session may be interchanged as presenter control devices and as endpoint display devices as desired such that any user in the collaborative work session may be operating and/or reviewing a display device, or may become the presenter wherein his/her computing device may be designated as the control device, as desired by the participants in the collaborative work session.

A presenting user may control application functionality and associated documents and/or content from a controlling device, and the documents and/or other content may be presented at one or more endpoint display devices. According to embodiments, the user may perform navigation and other application functionalities on the presenter control device, and the results of those actions and/or functionalities will be reflected in the documents and other content displayed on the one or more endpoint display devices. Alternatively, the presenting user may review document metadata, presenter notes, and perform one or more application functionalities on the presenter control device followed by publishing only those portions of a document or other content to the endpoint display devices as desired by the presenting user.

FIG. 1 illustrates a system architecture in which embodiments of the present invention may be practiced. In FIG. 1, a variety of computing devices are illustrated that may serve as both presenter control devices (also referred to as presentation control devices) and as endpoint display devices in a collaborative work session. For example, a small-form smartphone or other handheld computing device 110 is illustrated having a display surface 111 and being associated with a software application 115. A larger form tablet-style computing device 105 having a display surface 106 and an associated software application 115 is illustrated. A large display device 120 having a display surface 121 is illustrated being associated with a computer 125 and a software application 115.

As should be appreciated, the computing devices 105, 110, 120, 125 are purposes of illustration only and are not exhaustive of the various types of computing devices that may be used in accordance with embodiments of the present invention. For example, while the display device 120 is illustrated as a display unit with an associated computing device 125, the large-form display device 120 may operate as an integrated display/computing device that may be used for any suitable use from large-scale display uses, for example, in a conference room, to personal computing, as desired. According to embodiments, each of the computing devices illustrated in FIG. 1 may receive input through a variety of suitable means including touch or gesture input, keyboard input, mouse input, voice command input, electronic inking input, and the like.

Referring still to FIG. 1, the software applications 115 illustrated in association with each of the computing devices 105, 110, 120, 125 are illustrative of any of a variety of software applications that may be utilized in a collaborative work session according to embodiments of the present invention, for example, spreadsheet applications, word processing applications, slide presentation applications, electronic mail applications, calendaring applications, tasks applications, notes applications, desktop publishing applications, and the like. That is, any software application that may be operated on any of the computing devices 105, 110, 120, 125 may be operated in a manner that allows for functionality and/or documents or other content enabled by the applications 115 to be used in a collaborative work session between each of the different computing devices, as described herein. According to embodiments, each device 105, 110, 125 may share a single session of a given application 115 (via local client applications, via a server application, or via a cloud-based web services application), or each of the devices may run separate sessions locally and communicate commands and changes to each other as required.

Each of the computing devices 105, 110, 120, 125 may operate in a collaborative work environment through one or more wired or wireless data connections 145, 150, 155. That is, each of the computing devices may communicate with each other through wired or wireless data lines via direct connection, or via connection through a distributed computing network 130 such as an Internet or intranet.

According to embodiments, application functionality associated with each of the computing devices 105, 110, 120, 125 may operate according to one or more variations. For example, each application 115 may be a fully functional "thick" client application having all application functionality including the ability to send and receive data to and from other applications 115 operating on other computing devices in the collaborative work session. Each such application not only has its native functionality, for example, spreadsheet functionality, word processing functionality, slide presentation functionality, and the like, but according to embodiments of the present invention, each such application also contains sufficient computer executable instructions for allowing each application to operate as a control application for controlling information sent from a control device for receipt by an endpoint display device. Likewise, each such application has sufficient computer executable instructions for allowing the application to operate as an endpoint display device for receiving control functions from another computing device, as described below. For example, if the smartphone device 110 is operating as a presenter control device in a collaborative work session, then the application 115 is operative to allow a presenting user to send all or desired portions of a document or other content displayed on the presenter control device 110 to a receiving endpoint device 120, as described below.

According to another embodiment, the applications 115 associated with one or more of the computing devices may be "thin" client applications that contain only those functionalities required for allowing the associated device to receive content and instructions from a presenter control device maintaining a "thick" client application, as described above. That is, any of the devices 105, 110, 120 operating as an endpoint display device need not run a full implementation of a given software application 115 (e.g. spreadsheet application). Such an endpoint display device may only need to run an instance of the application 115 having sufficient computer executable instructions for communicating with other devices both as a presenter control device and as an endpoint display device. For example, in the case of a presenter control device, such an application need only have those computer executable instructions for allowing the device to send application commands, receive and read metadata about the application being controlled, and the like. In such a situation, a full implementation of the associated application 115 may be operated at the endpoint display device, and the application 115 operated at the presenter control device may have a significantly less functionality such that the device operates as a "remote control" for interacting with the full implementation of the application operating at the endpoint display device. Alternatively, the opposite setup may be utilized where a full implementation of the software application 115 may be operated at the presenter control device, and a lesser or "thinner" client application 115 may be operated at the endpoint display device that is only operative for receiving commands form the control device and for displaying functionality and content accordingly. Thus, the applications 115 associated with each device may allow for full application content entry and editing as well as collaborative work session control, or each device may be equipped with or associated with an application 115 that allows for less exhaustive uses as a "remote control" device, or as a "display only" device, as described herein. In some embodiments, the endpoint display device and the presenter control device are both "thin" clients with the full implementation of the software application 115 running on a server or as a cloud-based web application.

According to yet another embodiment, a collaborative work session, described herein, may operate via a service with which each of the computing devices 105, 110, 120, 125 may communicate via a distributed computing network 130, for example, the Internet. Referring still to FIG. 1, the computing device 135 is illustrative of an Internet-based or "cloud-based" server computer on which may be operated one or more web services applications 140 for providing the collaborative work session, as described herein. According to this embodiment, each of the devices 105, 110, 120, 125 may operate as thin client systems, and collaborative communication between the devices may be operated at the direction of the web services application 140 operated at a remote site. When a given computing device 105, 110, 120, 125 is operating as a presenter control device, such device will communicate desired functionality, instructions and content requirements to the web services application 140 via a distributed computing network 130, and resulting processing instructions will be passed from the web services application 140 through the distributed computing network to receiving endpoint devices.

Thus, according to this embodiment, if a presenting user of the smartphone device 110 desires to send certain content modifications for display on one or more endpoint display devices 105, 120, then instructions, navigation, content edits, and the like entered by the presenting user on the smartphone 110 will be passed to the remote server/computing system 135 for processing in accordance with instructions available from the web services application 140. Resulting information may then be passed from the web services application 140 through the distributed computing network to the desired endpoint devices 105, 120 for display, as desired by the presenting user. In such a web-based on cloud-based collaborative work session, each of the computing devices 105, 110, 120 may send and receive application functionality and/or content between each of the devices in the collaborative work session via an Internet browser application operated at each device through which application functionality and/or content may be provided via the web services application 140.

As should be appreciated, in any collaborative session, each of the devices 105, 110, 120 may act as presenter control devices and/or as endpoint display devices. Moreover, in a given session an application user interface operated on a designated presenter control device may include a full implementation of the application user interface, but the user interfaces displayed on the various endpoint devices may include only a subset of the functionality as available on the presenter control device. That is, an instance of an application user interface (e.g., spreadsheet application user interface) displayed on an endpoint display device may include a subset of functionalities available on an instance of the application user interface displayed on the presenter control device. When another device "takes over" as the presenter control device, then that device may then be set up with the full implementation of the application user interface.

Figure 2:
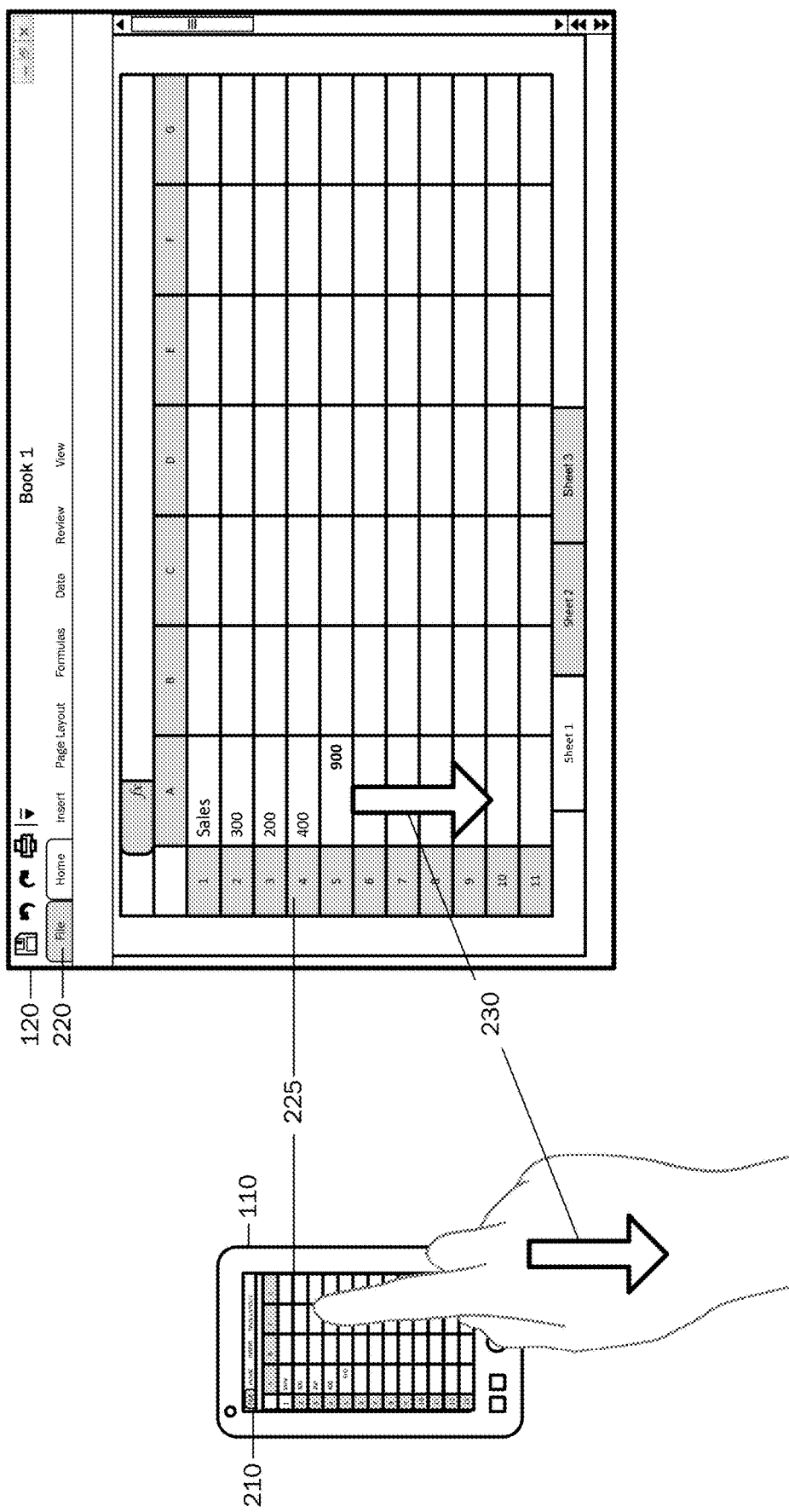
FIG. 2 illustrates an example spreadsheet application and associated content being displayed on a presenter control device and on an endpoint display device and showing user interaction with the presenter device and reflected interactions on the display device.

FIG. 2 illustrates an example spreadsheet application and associated content being displayed on a presenter control device and on an endpoint display device and illustrates user interaction with the presenter device and reflected interactions on the display device. As illustrated in FIG. 2, application functionality displayed in different form factor devices may be modified according to the shapes and sizes of the devices. In FIG. 2, a small-form smartphone 110 is illustrated as a presenter control device in a collaborative work session. For the smartphone device 110, the small-form display space allows for a truncated amount of display space as compared to the larger display space of the large-form display device 120. As illustrated on the smartphone 110, a small number of functionality buttons/controls 210 are provided owing to the small-form nature of the smartphone 110. In the illustrated large-form display device 120, a greater number of application functionality buttons/controls 220 are illustrated.

According to embodiments, when a collaborative work session is in progress between two such devices, the user of the small-form device 110 may find appropriate functionality and make appropriate content modifications in accordance with the application 115 associated with the presenter control device, and the results may be presented to and displayed in association with the endpoint display device according to the application 115 associated with that device. For example, a column of data 225 may not fit on the available display space of the small-form smartphone device 110, requiring the user to scroll through the data as the user presents and/or manipulates the data. On the other hand, on the large-form display device 120, the entire column of data may be displayed without the requirement for scrolling the data on the large-form device.

While the user of the small-form device 110 may be required to scroll the display in order to view and utilize the displayed data, the data displayed in the endpoint display device 120 may not need to scroll, so that those users viewing the data on the endpoint display device will not experience a scrolling of data as is required on the small-form smartphone device. As should be appreciated, if the presenter control user is using the large-form display unit 120 as a presenter control device, then the opposite situation may exist where that data presented from the large-form display device 120 to the small-form smartphone device 110 may require the recipient at the endpoint display device (smartphone) 110 to scroll the displayed information on the small-form device in order to review all the presented information. Thus, while the devices are functionally associated with each other as presenter/control and endpoint display devices, each device can operate separately in terms of its form factor and display size.

Referring still to FIG. 2, according to an alternative embodiment, all navigation functions applied by a presenter control user may be automatically reflected in the endpoint display device 120. As illustrated in FIG. 2, if the user touches the display screen of the smartphone 110 to scroll the data down for reviewing data not in display on the presenter control device 110, a resulting scrolling of data on the endpoint display device 120 may be automatically accomplished. Likewise, selection of a particular button or control in the application user interface of the presenter control device may be realized in the application user interface associated with the endpoint display device. For example, the selection of a particular button in the user interface displayed on the presenter/control device may be seen as a selection of the corresponding button in the user interface displayed on the endpoint display device.

According to embodiments, such corresponding navigation and functionality selection may be accomplished by duplicating the application display from the presenter control device 110 to the endpoint display device 120, such that the user interface and associated content displayed on the endpoint display device 120 is a duplicate of the display being utilized by the presenter on the presenter control device 110. Alternatively, such collaborative communication may be accomplished by capturing the user interactions performed at the presenter control device 110 and translating those captured interactions into corresponding actions that are then sent to the endpoint display device for use by the application 115 associated with the endpoint display device. For example, if a presenting user touches the display screen of the presenter control device 110, as illustrated in FIG. 2, followed by a downward swiping motion for navigating through the displayed content, the user's touch and swipe may be captured by the presenter control device, and may be translated into corresponding commands (e.g., a page down command or scroll down command) that may be sent to the application 115 associated with the endpoint display device 120 so that corresponding display movements, functionality selections, and the like may be operated on the endpoint display device 120. As should be appreciated, the interaction translation may occur at the client-side at each device 110, 120, or the translation and routing of such commands may operate at a remote cloud-based server 135 that in turn routes appropriate commands to endpoint display devices, as described above with reference to FIG. 1.

According to one embodiment, in a server-based implementation, a mode switch may be utilized for connected client devices to receive and display commands not commonly shared in a session, for example navigation, cell selection, and the like. That is, in a server-based implementation, the appropriate application functionality operating at the server location may appropriately receive commands from any of the devices operating in the collaborative work session followed by a translation of those commands to appropriate commands required by receiving endpoint display devices so that the appropriate commands may be sent to each device for causing the appropriate functionality and display changes to be made at each device.

Referring still to FIG. 2, according to embodiments of the present invention, a presenter control device 110 may be used for applying interactive operations according to the functionalities of the associated software application 115 such that the results of those functionalities are applied to the displayed user interface and associated documents or other content displayed at the endpoint display device 120. As illustrated in FIG. 2, if the user of the smartphone 110 applies a functionality, for example, a spreadsheet application filter, sort, drill, collapse/expand, data entry, and the like, to the data illustrated on the display surface of the smartphone 110, the results of those application functionalities may be displayed on the display surface of the endpoint display device 120. As described below, according to one embodiment, each of the user's interactions, and each of the associated functionality applications may be displayed at the endpoint display device such that those users viewing the endpoint display device may see the presenting user's interactions and data manipulations. Alternatively, as will be described below, the presenting user may perform various functions on the presenter control device 110, and the presenting user may only publish the results of those interactions to the endpoint display device 120.

If the presenter control device 110 and the endpoint display device 120 are running the same application session (e.g. same spreadsheet session) as is common in many server-based implementations, then the presenter control device 110 will only need to send navigation and data manipulation commands to the server-based application functionality, and the server-based application will correspond the appropriate commands to all connected client devices in the collaborative work session. Alternatively, if each of the applications are running locally as client-side applications, then all functionality commands and display changes may be sent to each endpoint display device, or only display changes (in the form of records revisions) may be sent to each receiving device.

Figure 3:
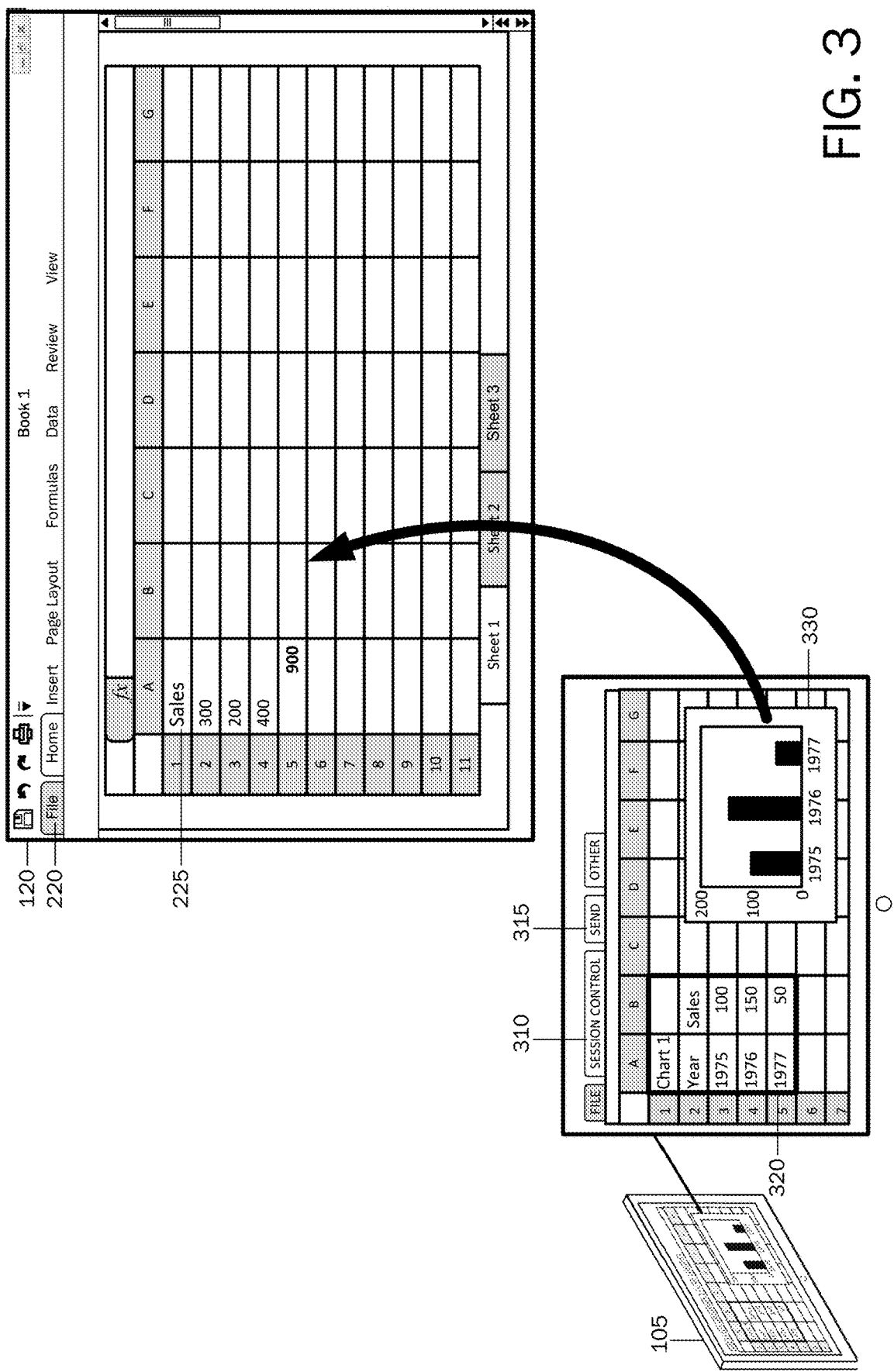
FIGS. 3 and 4 illustrate the sending of content displayed and/or modified on a presenter device to an endpoint display device.

FIG. 3 illustrates the sending of content displayed and/or modified on a presenter device to an endpoint display device. A tablet-style computing device 105 is illustrated as a presenter control device in a collaborative work session for communicating with an endpoint display device 120. As illustrated in the device 105, document content 320 and 330 is displayed in the presenter control device 105, but is not displayed in the display space of the endpoint display device 120. According to embodiments, a presenter may utilize the presenter control device 105 for performing application functionalities and data changes that subsequently will be published to an endpoint display device 120 on the command of the presenter/user so that those users viewing the presentation at the endpoint display device 120 do not see the data being entered, manipulated, reviewed or otherwise utilized at the presenter control device 105 until the presenter is ready to publish that information to the endpoint display device 120.

As illustrated in FIG. 3, a session control button 310 is provided and a send button 315 is provided. According to embodiments, the presenter/user may select the session control button 310 to allow the user to navigate application functionality and content on the presenter control device 105 before publishing the results of the navigation and application functionality to the endpoint display device 120. As should be appreciated, the session control button 310 and the send button 315 are for purposes of illustration only and such functionalities may be operated and displayed in a variety of other manners according to different software applications 115.

According to this embodiment, the presenter/user may get a preview of content that may be published to the display device 120 before the content is actually published. For example, a given presenter may have many pages of data, charts, tables and the like displayed on the presenter control device 105, but only a portion of that content may be suitable for display on the endpoint display device owing to content relevance, content detail, content security or the like. Thus, as described below, while all content displayed on the presenter control device may be automatically published to the endpoint display device, according to this embodiment, the presenter/user may preview those items that will be next displayed on the endpoint display device, and the presenter/user may ultimately decide which items to send to the endpoint display. A preview/next function may be provided by the application 115 that allows the presenter user to selectively see an actual preview of one or more data items on the presenter control device before the presenter user selectively sends the content to the one or more endpoint devices.

Figure 4:
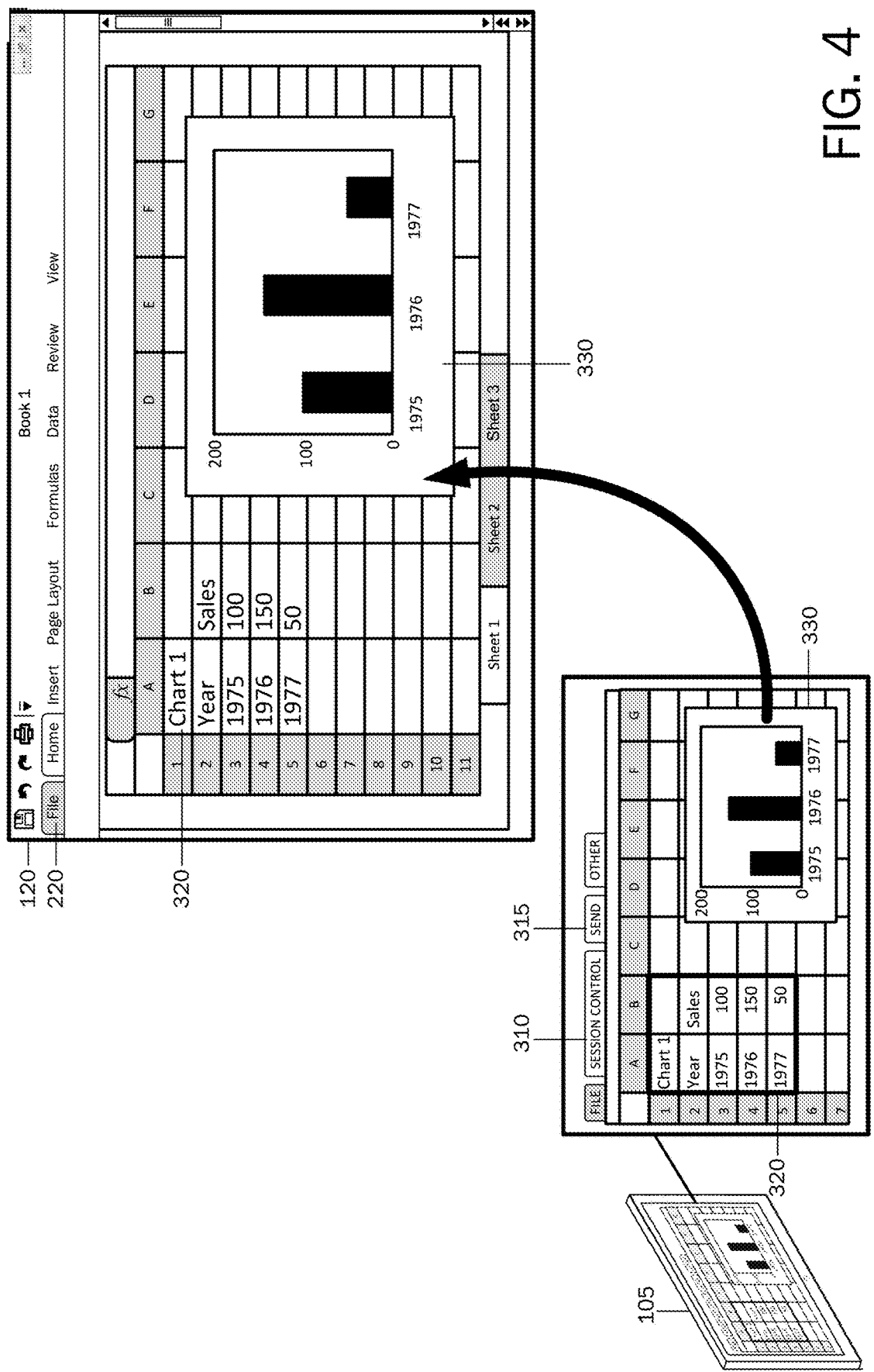

Referring now to FIG. 4, when the user selects the send button 315, or other appropriate application functionality, then the results of the user's navigation and application utilization at the presenter control device 105 are published to the endpoint display device 120 so that those users viewing the information on the endpoint display device 120 may now see the information desired by the presenter in the collaborative work session. As should be appreciated, the presenter may send all information displayed on the control device 105 to the endpoint display device 120, or the presenter may selectively send one or more content items to the endpoint display device 120. For example, referring to FIGS. 3 and 4, if desired, the presenter may send both the chart data 320 and the chart 330 to the endpoint display device 120, or the user may decide to send only the chart 330 to the endpoint display device 120 without sending the underlying chart data 320.

As should be appreciated, this functionality allows a presenter/user to operate in or in association with a locally running application or private collaboration mode in a shared session via a cloud-based service, followed by only sending those changes or revision records to the endpoint display device 120 as desired by the presenter/user. And, as described above, such an operation may apply to a single change, for example, presenter/user makes a change, sees the result and clicks or selects to send the change, or the user may send entire sets of changes wherein the applications 115 operating at the receiving endpoint display devices may receive those changes, apply them in order and display them accordingly.

Figure 5:
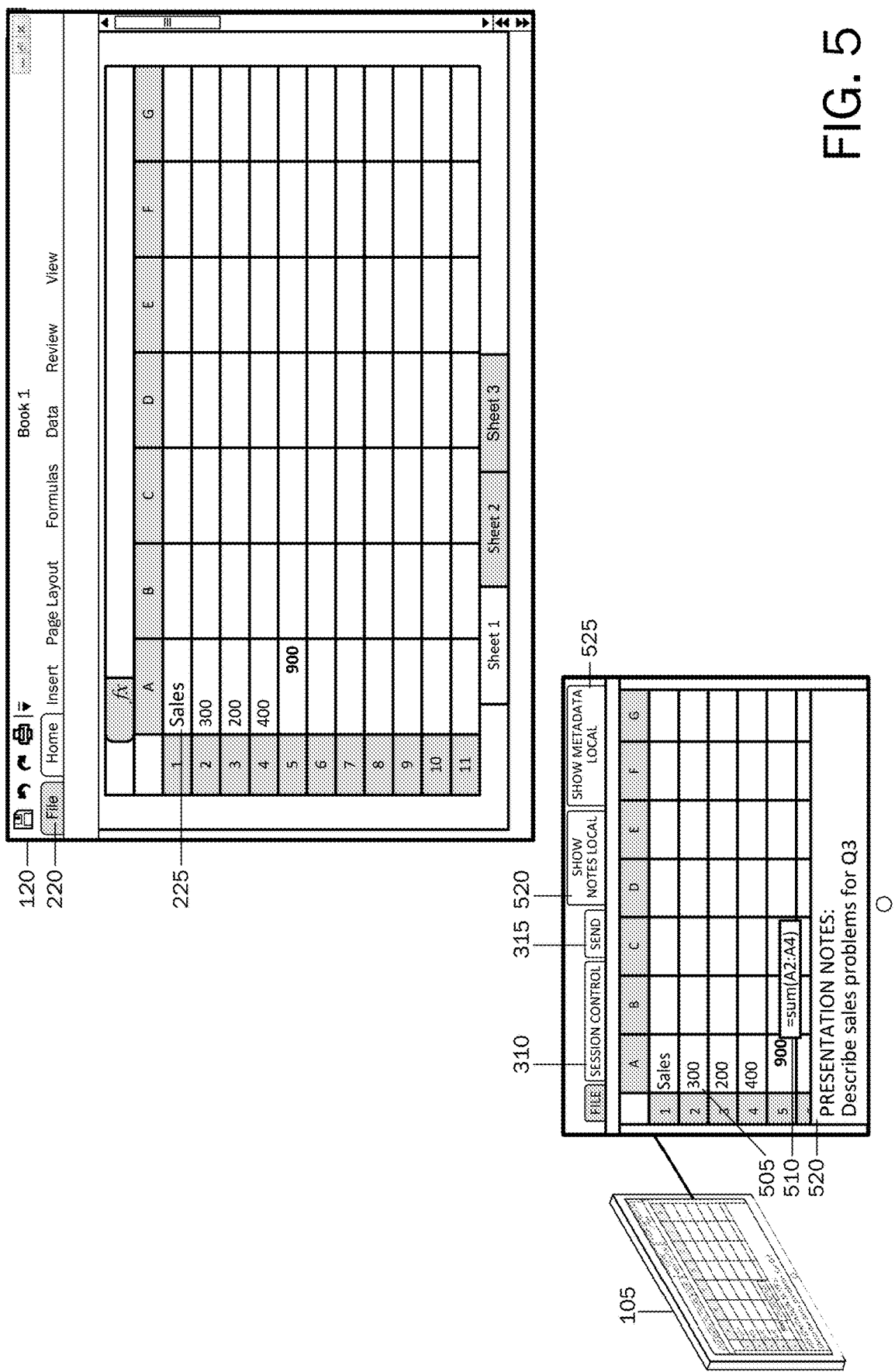
FIG. 5 illustrates the presentation of document metadata, presentation notes, comments, and the like on a presenter device, without publishing such information to a display device.
Figure 6:
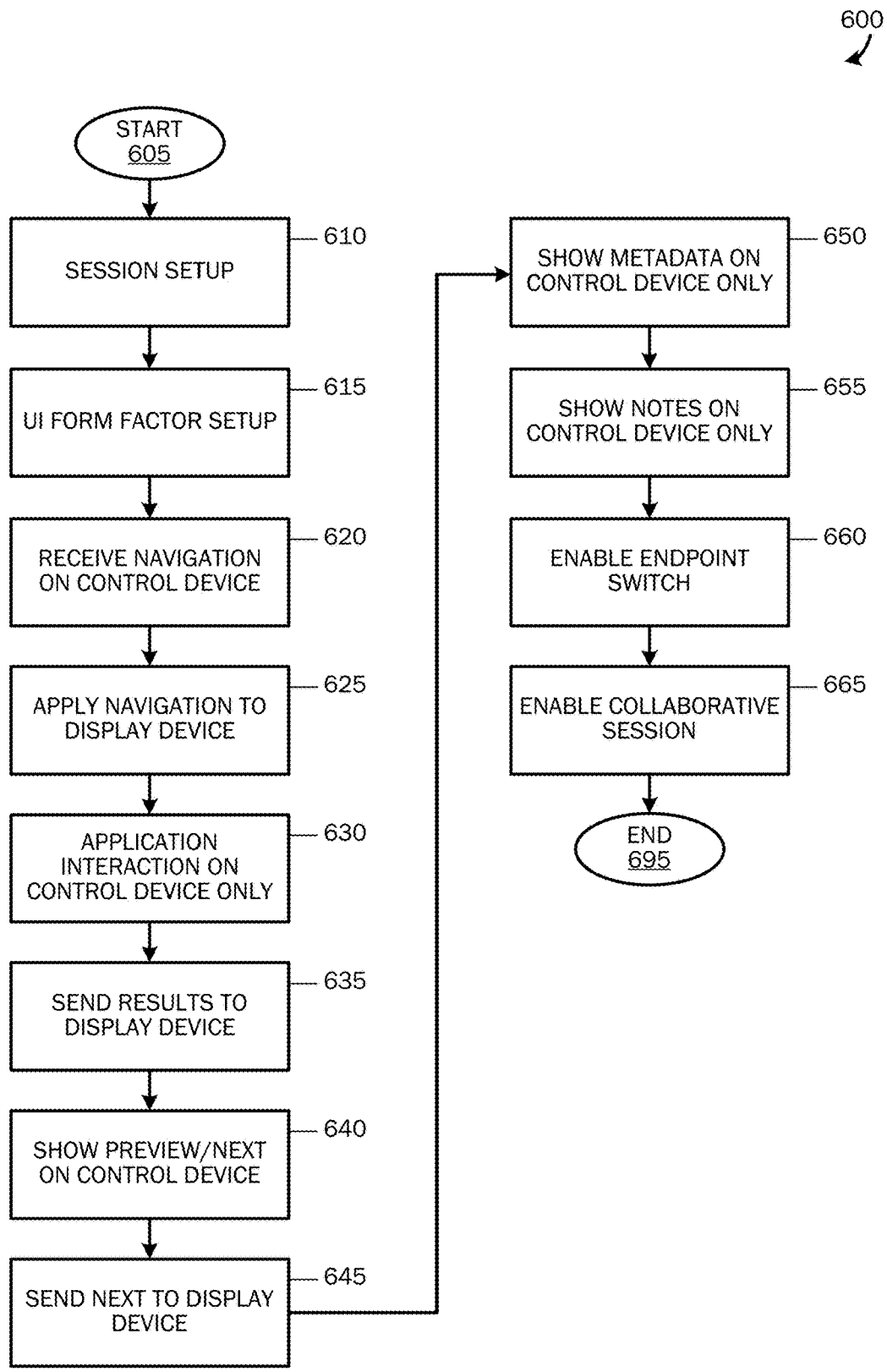
FIG. 6 is a flowchart of a method for providing application/document collaboration in a multi-device environment.

FIG. 5 illustrates the presentation of document metadata, presentation notes, comments, and the like on a presenter device, without publishing such information to a display device. According to one embodiment metadata associated with a given application document or other content may be exposed to a presenter/user at the presenter control device 105 without displaying the metadata in a corresponding display at the endpoint display device 120. For example, metadata such as formula definitions, external data, comments, values on cells or other document structures, and the like may be exposed to the presenter/user but not to other users at the endpoint display device 120. Referring to FIG. 5, a formula 510 is exposed as a metadata item to the result of a sales calculation, but the formula 510 is not exposed to users viewing the data at the endpoint display device 120. Thus, the presenter/user may, if desired, review various metadata items, as described above, for assisting the presenter/user in presenting the data to others without making the display of the resulting data at the endpoint display device 120 cumbersome to recipients. According to one embodiment, this may be accomplished by the software application 115 operating in association with the presenter control device or at the cloud-based web services application 140 wherein those data items designated as metadata items are displayed only at the local presenter control device 120 and all other display items are transmitted to the endpoint device 120 for display thereon.

Referring still to FIG. 5, according to embodiments, other information may be displayed on the presenter control device that is not published to the endpoint display device. For example, the presenter may import or enter a variety of presentation notes 520 that may be displayed on an instance of the application 115 user interface displayed to the presenter at the presenter control device, but such presentation notes, comments, or other useful information may not be published to the endpoint display device 120 unless publication of that information is desired by the user wherein the user may selectively send some or all the information to endpoint display devices upon command, as described above. Thus, while the all content displayed on the presenter control device may be automatically displayed on the one or more endpoint display devices, a lesser included content (i.e., less than all the content displayed on the presenter control device) may be displayed on the endpoint display device if desired by the presenter user.

According to embodiments, and as described above with reference to FIGS. 1 through 5, each device whether a presenter control device or an endpoint display device may be used as a full application editor, and the designation of one device as an endpoint display device may be switched to another device on demand. That is, if desired by a presenter, the designated endpoint display device 120 may be changed to a different device. For example, if a collaborative work session moves from one conference room to another conference room after a break, the presenter may quickly re-designate an endpoint display device in the second conference room as the appropriate receiving endpoint display device so that all collaborative work session information may be displayed to that device. In addition, if multiple users are operating in a collaborative work session, as described herein, each user may switch between roles as presenter/controllers and as recipients of information in the collaborative work session. That is, a given user may operate as a presenter/controller of the collaborative work session using his/her device as a presenter control device, but upon demand, his/her device may be re-designated as an endpoint display device receiving information from another user now operating as a presenter/controller with his computing device.

Having described an exemplary operating environment and various aspects of embodiments of the present invention above with reference to FIGS. 1 through 5, FIG. 6 is a flowchart of a method for providing application/document collaboration in a multi-device environment. The routine 600 begins at start operation 605 and proceeds to operation 610 where a collaborative work session is set up by associating each of the computing devices 105, 110, 120, 125 together in a collaborative work session, and by designating one of the devices as a presenter control device, and by designating one or more of the other devices as endpoint display devices. At operation 615, the user interface form factor for each device is set up for displaying application functionality and documents or other content in accordance with individual device form factor. As should be appreciated, operations 610, 615 may be performed as local client level functions, or may be performed at the command of a cloud-based server/computing system, as described above with reference to FIG. 1.

At operation 620, navigation on the presenter control device is received, and at operation 625, navigation performed at the presenter control device is implemented in an instance of the application user interface and associated document on the receiving endpoint device. At operation 630, application interaction is received at the presenter control device, and at operation 635, results of the application interaction including one or more data changes is presented at the endpoint display device, as described above. As described above, all content displayed on the presenter control device may be automatically displayed on the one or more endpoint display devices, or a lesser included amount or subset of the content displayed on the presenter control device may be published to the one or more endpoint display devices, as desired by the presenter user.

At operation 640, a preview or next function may be presented at the presenter control device to provide the presenter a preview of information that may be displayed to users at one or more endpoint display devices on demand by the presenter/user. At operation 645, the previewed or next information reviewed by the presenter/user at operation 640 may be sent to the endpoint display devices, as described above.

At operation 650, metadata associated with content and/or functionality available to the presenter/user at the presenter control device may be displayed to the presenter/user for review in association with collaborative work session documents and/or content. At operation 655, one or more presentation notes, comments, or other useful information may be displayed to the presenter/user at the presenter control device, as described above with reference to FIG. 5.

At operation 660, the designated endpoint display device may be switched such that a different one or more devices may be designated as the endpoint display devices for receiving information at the direction of the presenter control device, as described herein. At operation at 665, the collaborative work session, described herein is enabled, and the method 600 ends at operation 695.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
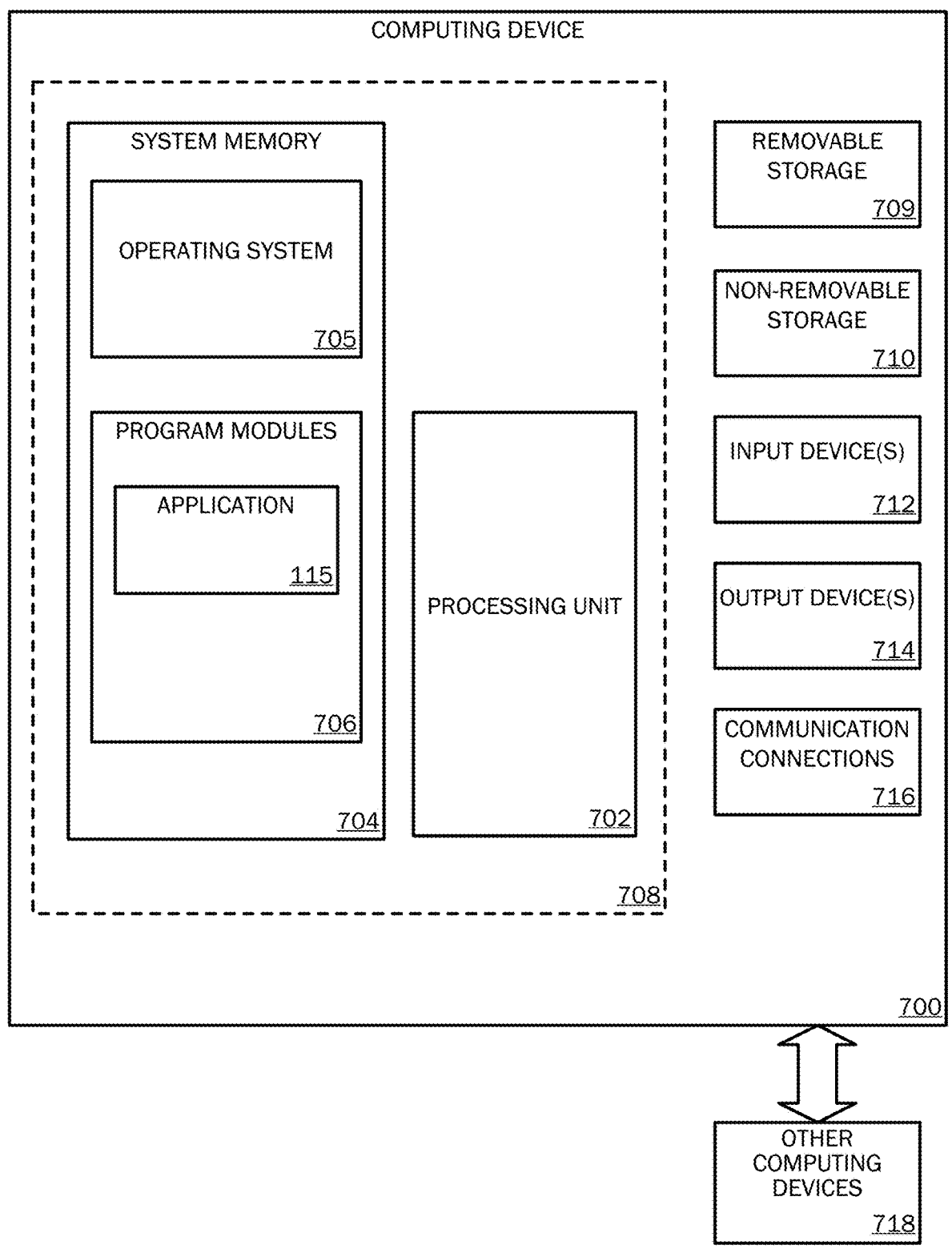
FIG. 7 is a block diagram illustrating example physical components of a computing device with which embodiments of the invention may be practiced.
Figure 8A:
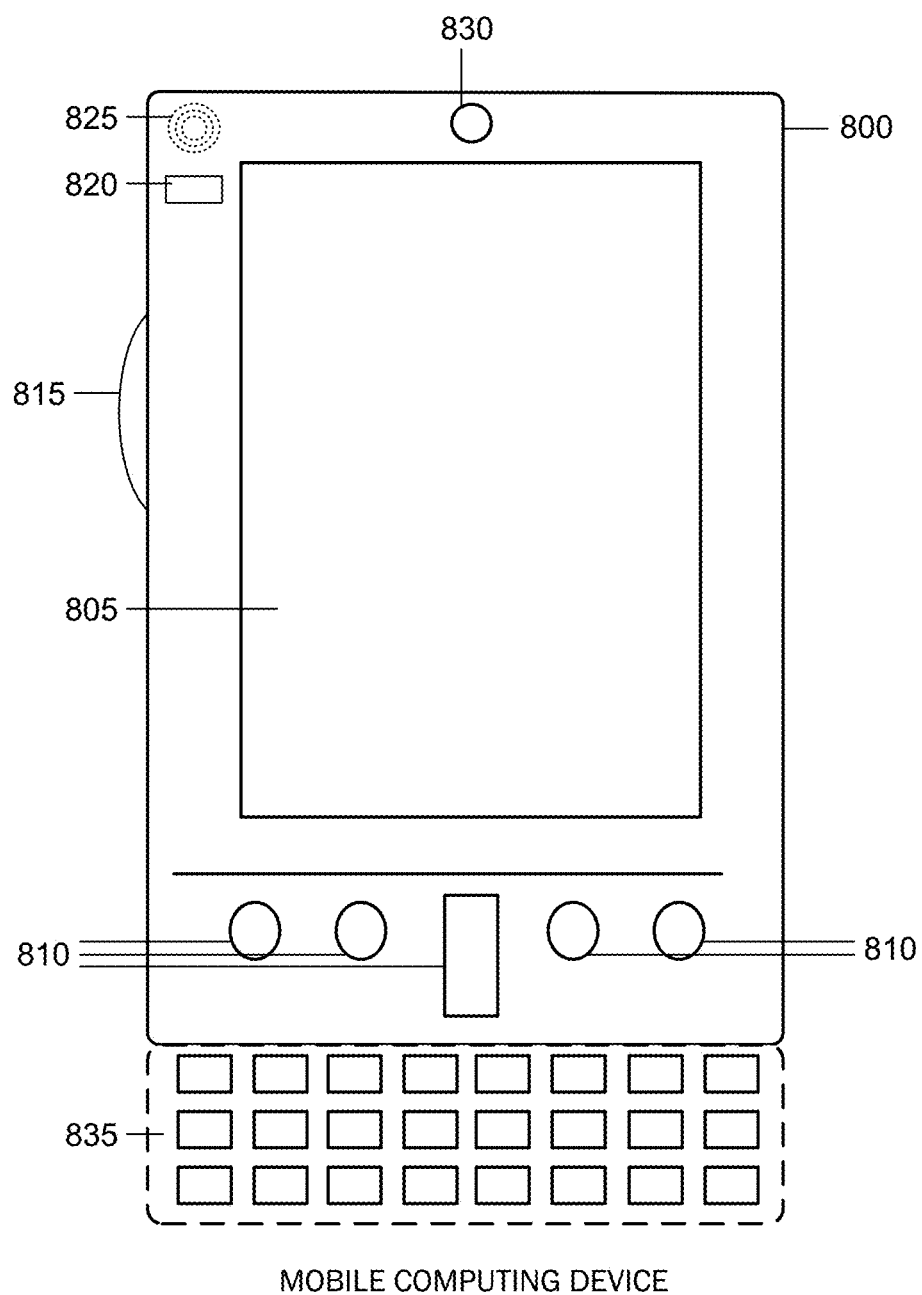
FIGS. 8A and 8B are simplified block diagrams of a mobile computing device with which embodiments of the present invention may be practiced.
Figure 8B:
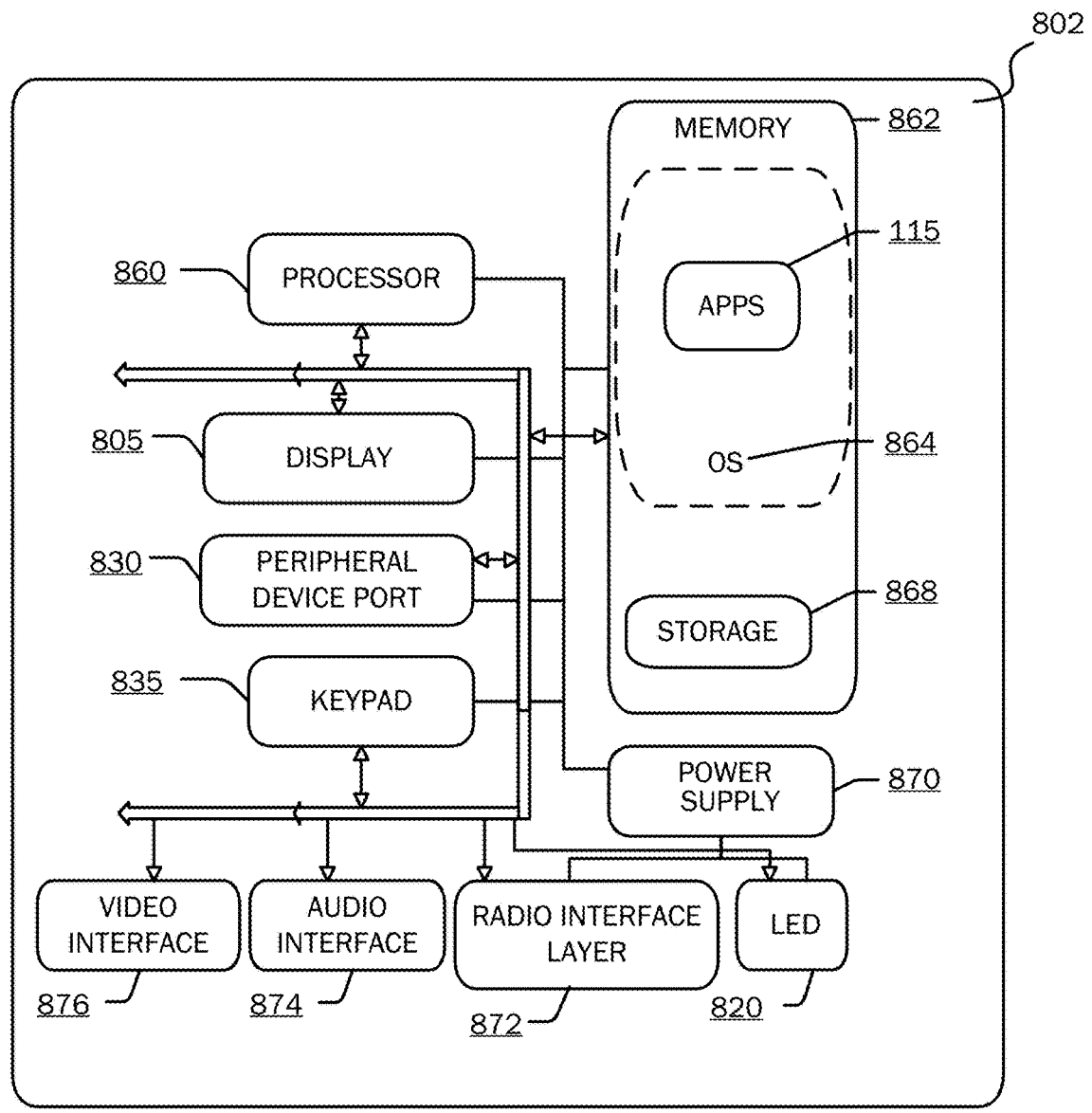
Figure 9:
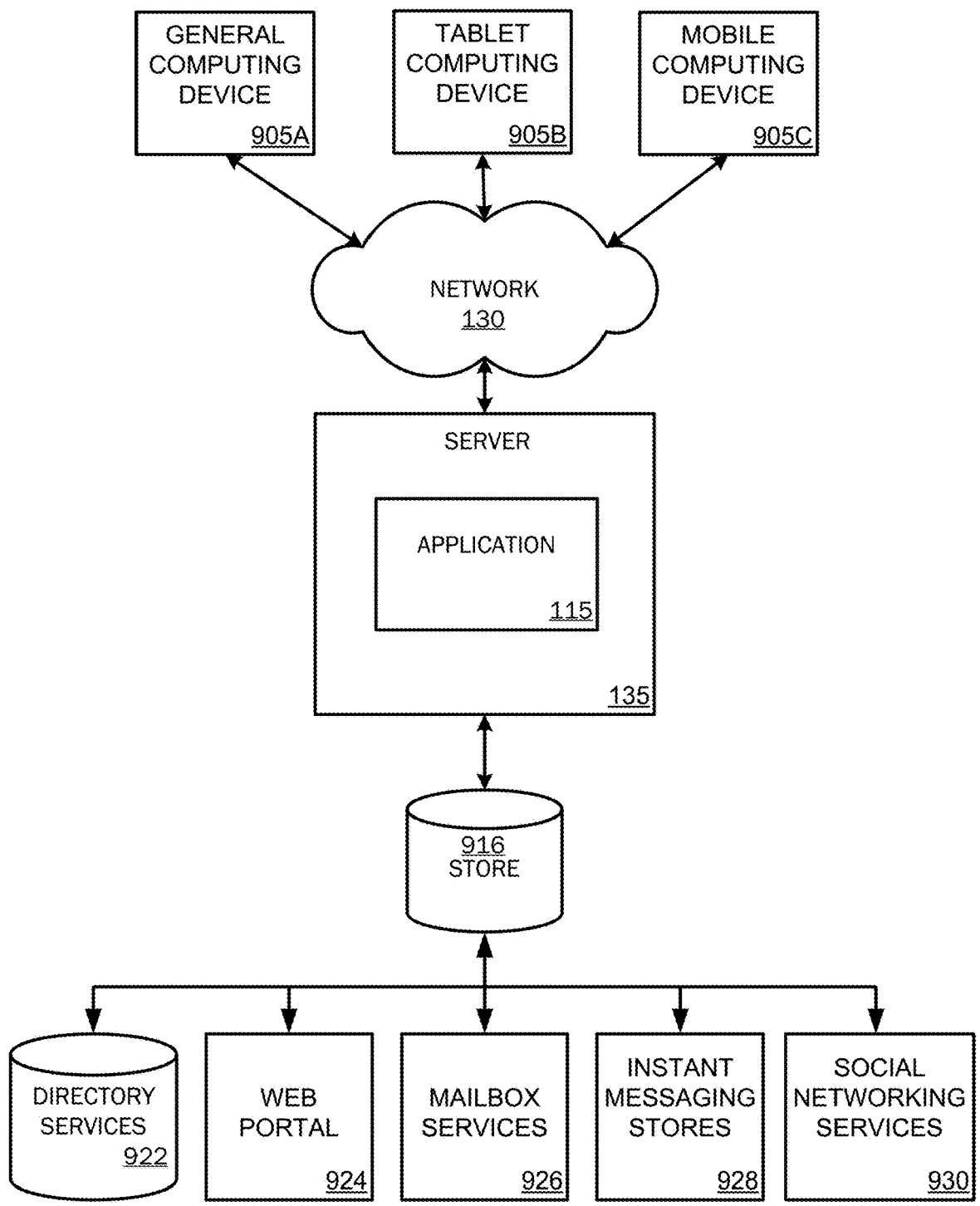
FIG. 9 is a simplified block diagram of a distributed computing system in which embodiments of the present invention may be practiced.

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating physical components (i.e., hardware) of a computing device 700 with which embodiments of the invention may be practiced. The computing device components described below may be suitable for the computing devices 105, 110, 120, 125, 135 described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running a variety of applications 720. The operating system 705, for example, may be suitable for controlling the operation of the computing device 700. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including, but not limited to, one or more of the stages of the method 600 illustrated in FIG. 6. Other program modules that may be used in accordance with embodiments of the present invention may include applications, such as, spreadsheet applications, notes applications, Internet browser applications, electronic mail and contacts applications, word processing applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to use of web page content may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700.

FIGS. 8A and 8B illustrate a mobile computing device 800, for example, a mobile telephone 110, a smart phone 110, a tablet-style personal computer 105, a laptop computer, and the like, with which embodiments of the invention may be practiced. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs may be loaded into the memory 862 and run on or in association with the operating system 864. Examples of the application programs include phone dialer applications, e-mail applications, personal information management (PIM) applications, word processing applications, spreadsheet applications, Internet browser applications, notes applications, messaging applications, and so forth. The system 802 also includes a non-volatile storage area 868 within the memory 862. The non-volatile storage area 868 may be used to store persistent information that should not be lost if the system 802 is powered down. The application programs may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs via the operating system 864, and vice versa.

The visual indicator 820 may be used to provide visual notifications and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing web page content utilization, as described above. Content developed, interacted with, or edited in association with embodiments of the invention may be stored in different communication channels or other storage types. For example, various documents and stored content items (including web page content) may be stored using a directory service 922, a web portal 924, a mailbox service 926, an instant messaging store 928, or a social networking site 930. The web content utilization functionality described herein may use any of these types of systems or the like for enabling data utilization, as described herein. A server 135 may provide output of the web content and associated functionality to clients. As one example, the server 135 may be a web server providing the web content and associated functionality over the web. The server 135 may provide the output of the web content and associated functionality over the web to clients through a network 130. By way of example, the client computing device may be implemented and embodied in a personal computer 700, a tablet computing device 105 and/or a mobile computing device 110 (e.g., a smart phone), or other computing device. Any of these embodiments of the client computing device 700, 105, 110, 120, 125 may obtain content from the store 916.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A computer-implemented method of collaboration in a multi-device environment, comprising:

displaying, at a control device via a cloud-based application, electronic content, wherein the electronic content is a spreadsheet, wherein the control device displays a smaller form factor than an endpoint display device, and wherein at least one control provided on the control device by the cloud-based application is operable to navigate display of the electronic content on the endpoint display device;

providing the electronic content to the endpoint display device;

receiving a change to the electronic content from the control device via the cloud-based application, wherein the change comprises a result of a formula;

translating the change to a format interpretable by the endpoint display device;

providing the translated change to the electronic content to the endpoint display device, wherein the translated change is interpretable for displaying the result of the formula and not the formula on the endpoint display device based on the format; and displaying the result and the formula at the control device.

2. The computer-implemented method of claim 1, wherein the electronic content is a video stream.

3. The computer-implemented method of claim 1, further comprising:

in response to receiving the change to the electronic content, providing a preview of a corresponding change at the control device via the cloud-based application before the corresponding change is made to the electronic content provided to the endpoint display device.

4. The computer-implemented method of claim 3, further comprising:

after providing the preview, providing the translated change to the electronic content to the endpoint display device.

5. The computer-implemented method of claim 3, wherein in response to providing the preview of the corresponding change, the method further comprising:

providing a command to make a lesser included change to the electronic content provided to the endpoint display device.

6. The computer-implemented method of claim 1, includes providing the electronic content to the endpoint display device according to a form factor of the endpoint display device.

7. The computer-implemented method of claim 1, wherein providing the electronic content to the endpoint display device includes duplicating the electronic content displayed via the cloud-based application to the endpoint display device.

8. The computer-implemented method of claim 1, further comprising:

receiving, via the cloud-based application, a command on the electronic content;

applying the received command to the electronic content; and applying the received command to the electronic content provided to the endpoint display device.

9. The computer-implemented method of claim 8, further comprising:

operatively associating the cloud-based application with the endpoint display device such that commands received via the cloud-based application are automatically passed to the endpoint display device for application to the electronic content provided to the endpoint display device.

10. The computer-implemented method of claim 8, wherein applying the received command to the electronic content provided to the endpoint display device includes capturing the received command and translating the received command for application to the electronic content provided to the endpoint display device.

11. The computer-implemented method of claim 1, wherein translating the change to a format interpretable by the endpoint display device includes providing a lesser included change to the electronic content provided to the endpoint display device.

12. The computer-implemented method of claim 1, further comprising:

providing, via the cloud-based application, one or more metadata items for the electronic content that are not provided with the electronic content to the endpoint display device.

13. The computer-implemented method of claim 1, further comprising:

providing, via the cloud-based application, one or more presentation notes for the electronic content that are not provided with the electronic content to the endpoint display device.

14. The computer-implemented method of claim 1, further comprising:

providing a command, via the cloud-based application, to designate a different display device as a second endpoint display device such that the electronic content is provided to the second endpoint display device.

15. The computer-implemented method of claim 1, further comprising:

providing a command, via the cloud-based application, to designate another display device as a second endpoint display device such that providing the electronic content to the endpoint display device includes providing the electronic content to both the endpoint display device and the second endpoint display device.

16. The computer-implemented method of claim 1, further comprising:

prior to providing the electronic content to the endpoint display device, displaying an instance of an application user interface on the endpoint display device, wherein the instance of the application user interface has a subset of functionalities available on an instance of the application user interface displayed on the control device.

17. A computing system, comprising:

at least one processing unit; and at least one memory storing computer-executable instructions that when executed by the at least one processing unit causes the computing system to:

display, at a control device via a cloud-based application, electronic content, wherein the electronic content is a spreadsheet, wherein the control device displays a smaller form factor than an endpoint display device, and wherein at least one control provided on the control device by the cloud-based application is operable to navigate display of the electronic content on the endpoint display device;

provide the electronic content to the endpoint display device;

receive a change to the electronic content from the control device via the cloud-based application, wherein the change comprises a result of a formula;

translate the change to a format interpretable by the endpoint display device;

provide the translated change to the electronic content to the endpoint display device, wherein the translated change is interpretable for displaying the result of the formula and not the formula on the endpoint display device based on the format; and concurrently displaying the result and the formula at the control device.

18. The computing system of claim 17, wherein the electronic content is a video stream.

19. A method implemented based on computer-executable instructions that when executed by at least one processing unit causes a computing system to perform the method, the method comprising:
- displaying, at a control device via a cloud-based application, electronic content, wherein the electronic content is a spreadsheet, wherein the control device displays a smaller form factor than an endpoint display device, and wherein at least one control provided on the control device by the cloud-based application is operable to navigate display of the electronic content on the endpoint display device;
- providing the electronic content to the endpoint display device;
- receiving a change to the electronic content from the control device via the cloud-based application, wherein the change is a result of a formula;
- translating the change to a format interpretable by the endpoint display device;
- providing the translated change to the electronic content to the endpoint display device, wherein the translated change is interpretable for displaying the result of the formula and not the formula on the endpoint display device based on the format; and
- in response to an indication from the control device, displaying the result and the formula at the control device.

20. The method of claim 19, wherein the electronic content is a video stream.

* * * * *